Aug. 7, 1923.　　　　　　　　　　　　　　　　1,464,364
G. H. JAMES
STOCKLESS ANCHOR
Filed Oct. 15, 1921
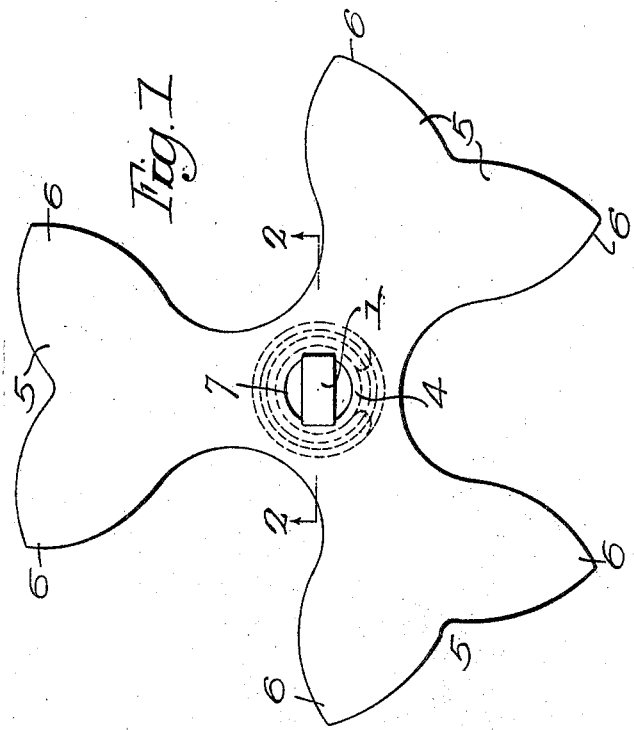
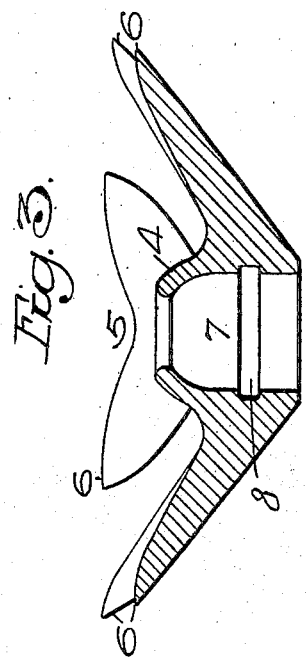
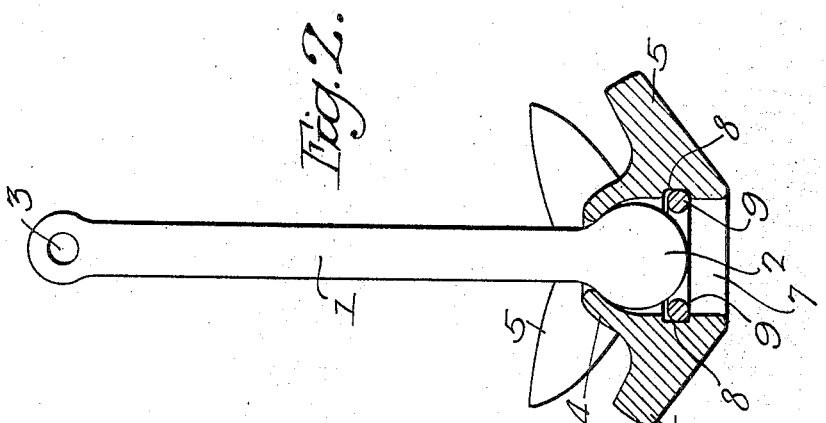
Inventor  
George H. James.  
by his Attorneys Patented Aug. 7, 1923.

1,464,364

UNITED STATES PATENT OFFICE.

GEORGE H. JAMES, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

STOCKLESS ANCHOR.

Application filed October 15, 1921. Serial No. 507,930.

*To all whom it may concern:*

Be it known that I, GEORGE H. JAMES, a citizen of the United States, residing in Philadelphia, Pennsylvania, have invented the Stockless Anchor, of which the following is a specification.

One object of this invention is to provide an anchor of the stockless type which shall be of such construction as to more quickly dig into the sea bottom and hold more firmly than has heretofore been possible with the constructions heretofore employed;—the arrangement of parts being such as to permit of a relatively great angular movement in any direction of the shank relatively to the body of the anchor.

Another object of my invention is to provide an anchor having the above characteristics, whose construction shall be such as to permit it to be easily kept clean and will permit of its being quickly and easily stowed in a hawse pipe, its construction being such that it possesses the qualities necessary to permit it to be used either as a mushroom anchor, a kedge, or a mooring anchor.

I also desire to provide an anchor of the above type which in addition to being of a simple construction, may be inexpensive to manufacture and quickly and easily assembled.

These objects and other advantageous ends I attain as hereinafter set forth, reference being had to the accompanying drawings, in which, Fig. 1 is a plan of an anchor constructed in accordance with my invention;

Fig. 2 is a section on the line 2—2, Fig. 1; and

Fig. 3 is a section similar to Fig. 2 with the shank and its retaining ring removed.

In the above drawings, 1 represents a shank, which in the present instance consists of an elongated bar having one end enlarged in the form of a ball-shaped head 2, while its opposite end is provided with an opening 3 for the reception of a rope or cable. The body of the anchor consists of a casting having a central crown or hollow hub 4 formed with three flukes 5 radiating at equal distances from each other. The center lines of these flukes are thus 120° apart and each of them has the conventional outline of a fish tail, being double-pointed and laterally extended. The edges 6 of the flukes are relatively sharp and they are angularly displaced toward the shank 1 from a plane at right angles to the line thereof at an angle of somewhat less than 45° in the present instance, although this may be varied without departing from my invention.

The cavity of the socket structure 4 has at one end an opening sufficient to permit of the free passage of the body of the shank 1 without allowing passage of the spherical head 2 and is spherically curved internally to provide a bearing for said head. The cavity of said socket has a second and larger opening 7 opposite said first opening, which like it is preferably circular in outline and of a diameter sufficient to permit entrance of the head 2.

In the walls of the cavity of the socket structure adjacent this latter opening is an annular recess 8 for the reception of a split ring 9 of spring steel or equivalent material whose ends are sufficiently far apart to permit of their being forcibly brought together in order to permit of its insertion through said opening 7. When fully expanded in the annular recess 8 however, said ring is designed to retain in the socket the head 2 of the anchor, since the diameter of said head is greater than the opening through the ring 9.

With the above described arrangement of parts the shank 1 is free to turn axially relatively to the body of the anchor and also may swing in any direction through a relatively wide angle from its position in line with the axis of said body. The relatively wide twin flukes of the anchor will quickly dig into the sand or mud sea bottom and will effectually hold thereto, since the adjacent points 6 of any two adjacent twin flukes project in substantially parallel lines and have considerable lateral breadth. Further, owing to the wide lateral extent of the flukes under conditions of use the device possesses the characteristics of a mushroom- kedge- and mooring-anchor.

I claim:

An anchor having more than two double-pointed flukes, each of said flukes having pointed extremities and the medial lines of the pointed extremities of each fluke extending substantially parallel with the medial lines of adjacent extremities of adjacent flukes respectively.

GEORGE H. JAMES.